US008327666B2

(12) United States Patent
Harvey et al.

(10) Patent No.: US 8,327,666 B2
(45) Date of Patent: Dec. 11, 2012

(54) METHOD OF SEPARATING STRENGTHENED GLASS

(75) Inventors: Daniel R Harvey, Bath, NY (US); Alexander Mikhailovich Streltsov, Corning, NY (US)

(73) Assignee: Corning Incorporated, Corning, NY (US)

( * ) Notice: Subject to any disclaimer, the term of this patent is extended or adjusted under 35 U.S.C. 154(b) by 318 days.

(21) Appl. No.: 12/388,837

(22) Filed: Feb. 19, 2009

(65) Prior Publication Data

US 2010/0206008 A1 Aug. 19, 2010

(51) Int. Cl.
*C03B 33/02* (2006.01)
(52) U.S. Cl. .......................................... 65/112
(58) Field of Classification Search ............ 65/105, 65/112, 174
See application file for complete search history.

(56) References Cited

U.S. PATENT DOCUMENTS

| | | | |
|---|---|---|---|
| 4,468,534 A | 8/1984 | Boddicker | |
| 4,702,042 A | 10/1987 | Herrington et al. | |
| 6,211,488 B1 | 4/2001 | Hoekstra et al. | |
| 6,676,878 B2 | 1/2004 | O'Brien et al. | |
| 6,949,485 B2 * | 9/2005 | Nakashima et al. | 501/69 |
| 6,992,026 B2 | 1/2006 | Fukuyo et al. | |
| 7,157,038 B2 | 1/2007 | Baird et al. | |
| 7,169,688 B2 | 1/2007 | Liu | |
| 7,396,742 B2 | 7/2008 | Fukuyo et al. | |
| 7,547,613 B2 | 6/2009 | Fukuyo et al. | |
| 7,592,238 B2 | 9/2009 | Fukuyo et al. | |
| 7,615,721 B2 | 11/2009 | Fukuyo et al. | |
| 7,626,137 B2 | 12/2009 | Fukuyo et al. | |
| 7,732,730 B2 | 6/2010 | Fukuyo et al. | |
| 7,825,350 B2 | 11/2010 | Fukuyo et al. | |
| 7,871,903 B2 | 1/2011 | Couch et al. | |
| 2005/0221044 A1 | 10/2005 | Gaume et al. | |
| 2006/0138798 A1 * | 6/2006 | Oehrlein | 296/84.1 |

(Continued)

FOREIGN PATENT DOCUMENTS

DE 102007009786 A1 8/2008

(Continued)

OTHER PUBLICATIONS

DE 10 2007 009 786 A1 (Krzyzak Marta) Aug. 28, 2008 (English language machine translation of foreign patent already of record on applicant's IDS dated May 19, 2010). [online] [retrieved Mar. 22, 2011]. Retreived from: European Patent Office Espacenet.*

(Continued)

*Primary Examiner* — Matthew Daniels
*Assistant Examiner* — Erin Snelting
(74) *Attorney, Agent, or Firm* — Robert P. Santandrea

(57) ABSTRACT

A method of cutting a glass sheet that has been thermally or chemically strengthened along a predetermined line, axis, or direction with high speed and with minimum damage on the cut edges. The strengthened glass sheet may be cut into at least two pieces, one of which having a predetermined shape or dimension. At least one damage line is formed within the strengthened glass sheet. The at least one damage line is formed outside the strengthened compressive stress surface layers and within the tensile stress layer of the strengthened glass sheet. The at least one damage line may be formed by laser treatment. A crack is initiated in the strengthened glass sheet and propagated along the at least one damage line to separate the strengthened glass sheet along the predetermined line, axis, or direction into at least two pieces.

23 Claims, 3 Drawing Sheets

U.S. PATENT DOCUMENTS

| | | |
|---|---|---|
| 2006/0255195 A1 | 11/2006 | Chen et al. |
| 2007/0090100 A1 | 4/2007 | Yonai et al. |
| 2008/0286548 A1 | 11/2008 | Ellison et al. |
| 2010/0055876 A1 | 3/2010 | Fukuyo et al. |
| 2010/0176100 A1 | 7/2010 | Fukuyo et al. |
| 2011/0021004 A1 | 1/2011 | Fukuyo et al. |
| 2011/0027971 A1 | 2/2011 | Fukuyo et al. |
| 2011/0027972 A1 | 2/2011 | Fukuyo et al. |
| 2011/0037149 A1 | 2/2011 | Fukuyo et al. |

FOREIGN PATENT DOCUMENTS

| | | |
|---|---|---|
| EP | 0793132 A1 | 9/1997 |
| JP | 2002192369 A | 7/2002 |
| JP | 2004268104 A | 9/2004 |
| JP | 2004299969 A | 10/2004 |
| JP | 2007290304 A | 11/2007 |
| JP | 2009061462 A | 3/2009 |
| JP | 200972829 A | 4/2009 |
| JP | 4490883 B2 | 6/2010 |
| KR | 626553 B1 | 9/2006 |
| KR | 2007031467 A | 3/2007 |
| KR | 100921662 B1 | 10/2009 |
| KR | 934300 B1 | 12/2009 |
| KR | 945980 B1 | 3/2010 |

OTHER PUBLICATIONS

U.S. Appl. No. 12/277,573, by Matthew J. Dejneka et al, entitled "Glasses Having Improved Toughness and Scratch Resistance", filed Nov. 25, 2008.

U.S. Appl. No. 61/067,130, by Matthew J. Dejneka et al, entitled "Fining Agents for Silicate Glasses", filed Feb. 26, 2008.

U.S. Appl. No. 61/067,732 by Matthew J. Dejneka et al, entitled "Ion-Exchanged, Fast Cooled Glasses", filed Feb. 29, 2008.

U.S. Appl. No. 61/087,324 by Kristen L. Barefoot et al, entitled "Chemically Tempered Cover Glass" filed Aug. 8, 2008.

U.S. Appl. No. 61/079,995 by Douglas C. Allan et al, entitled "Glass With Compressive Surface for Consumer Applications", filed Jul. 11, 2008.

U.S. Appl. No. 61/084398, by Christopher M. Lee et al, entitled "Dual Stage Ion Exchange for Chemical Strengthening of Glass" filed Jul. 29, 2008.

* cited by examiner

100

METHOD OF SEPARATING STRENGTHENED GLASS

BACKGROUND

Thermal tempering and chemical treatments by ion exchange are widely recognized means for strengthening glass. Glasses strengthened by such processes have compressive stress in the surface layers and tensile stress in the bulk.

Glasses that are either tempered or chemically strengthened are difficult, if not impossible, to cut or separate into pieces of desired shape and/or sizes. Cutting operations are therefore performed before carrying out strengthening operations. Conventional score-and-break techniques do not work because the initial crack does not propagate along the score line, but instead tends to bifurcate multiple times. Consequently, the glass sample usually breaks into multiple pieces.

SUMMARY

A method of cutting a glass sheet that has been thermally or chemically strengthened along a predetermined line, axis, or direction with high speed and with minimum damage on the cut edges is provided. The strengthened glass sheet may be cut into at least two pieces, one of which having a predetermined shape or dimension. At least one damage line is formed within the strengthened glass sheet. The at least one damage line is formed outside the strengthened compressive stress surface layers and within the tensile stress layer of the strengthened glass sheet. The at least one damage line may be formed by laser treatment. A crack is initiated in the strengthened glass sheet and propagated along the at least one damage line to separate the strengthened glass sheet along the predetermined line, axis, or direction into at least two pieces.

Accordingly, one aspect of the invention is to provide a method of separating a strengthened glass sheet. The method comprises: providing the strengthened glass sheet, the strengthened glass sheet having a first surface and a second surface, wherein each of the first surface and the second surface has a strengthened surface layer under a compressive stress and extending from the surface to a depth of layer, and a central region under a tensile stress; forming at least one damage line in the central region; and initiating and propagating a crack to separate the glass sheet along the at least one damage line into at least two pieces, wherein at least one of the pieces has at least one of a predetermined shape and a predetermined dimension.

A second aspect of the invention is to provide a method of separating a strengthened glass sheet. The method comprises: providing the strengthened glass sheet, the strengthened glass sheet having a first surface and a second surface, wherein each of the first surface and the second surface have a strengthened surface layer under a compressive stress and extending from the surface to a depth of layer, and a central region under a tensile stress; forming a first laser-induced damage line in the central region; forming a second laser-induced damage line, the second laser-induced damage line being located between the strengthened surface layer of the first surface and the first laser-induced damage line, the second laser-induced damage being parallel to the first laser-induced damage line, the first laser-induced damage line and the second laser-induced damage line defining a plane being perpendicular to the first surface and the second surface; and initiating and propagating a crack to separate the strengthened glass sheet into at least two pieces, wherein at least one of the pieces has at least one of a predetermined shape and a predetermined dimension.

A third aspect of the invention is to provide a strengthened glass article comprising: a first surface and a second surface, wherein each of the first surface and the second surface has a strengthened surface layer under a compressive stress and extending from the surface to a depth of layer, and a central region under a tensile stress; and at least one edge joining the first and second surface, wherein the at least one edge is substantially free of chipping.

These and other aspects, advantages, and salient features will become apparent from the following detailed description, the accompanying drawings, and the appended claims.

DETAILED DESCRIPTION

Figure 1:
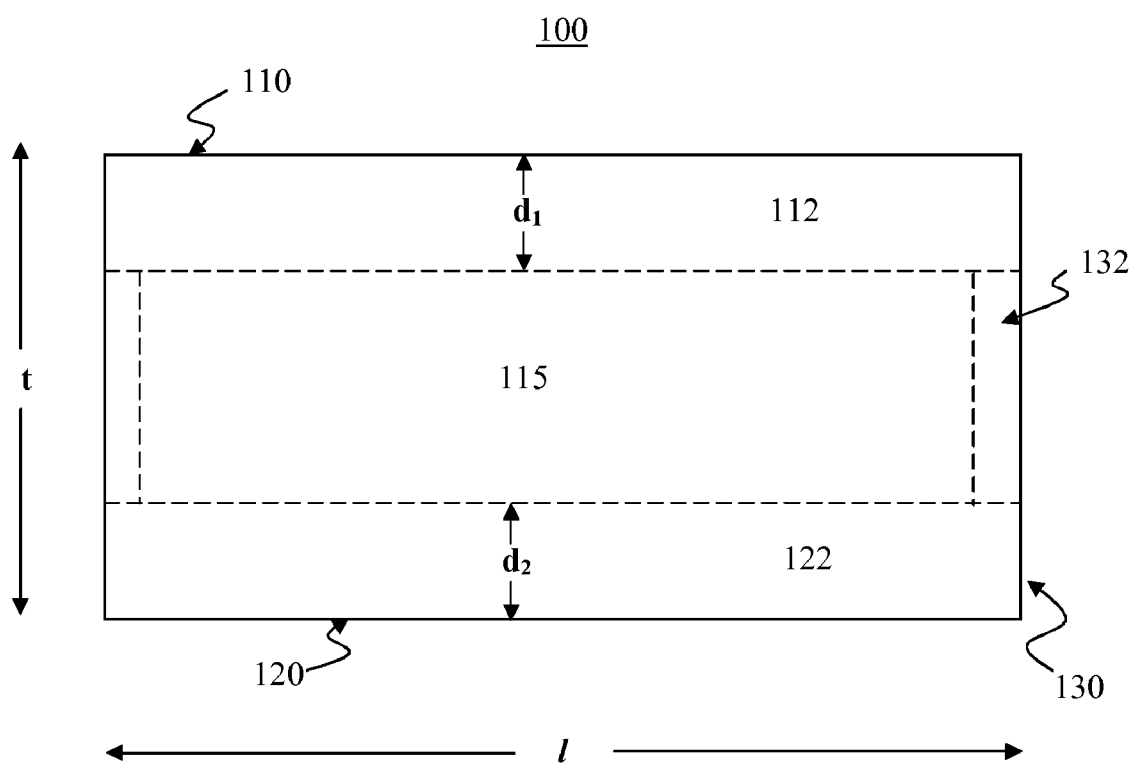
FIG. 1 is a schematic cross-sectional view of a strengthened glass sheet.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range.

Referring to the drawings in general and to FIG. 1 in particular, it will be understood that the illustrations are for the purpose of describing a particular embodiment and are not intended to limit the disclosure or appended claims thereto. The drawings are not necessarily to scale, and certain features and certain views of the drawings may be shown exaggerated in scale or in schematic in the interest of clarity and conciseness.

As used herein, the terms "separate," "divide," and "cut," unless otherwise specified, are considered to be equivalent terms and are used interchangeably and refer to the separation or division of a glass article, such as a sheet, into one or more pieces by physical means.

Glasses that are strengthened by either thermal tempering or chemical processes such as ion exchange have surface layers that are under compressive stress and a central portion under a tensile stress. The presence of such layers makes such glasses difficult to separate or divide into individual pieces of desired shape and dimensions by conventional methods, such as score-and-break techniques. Rather than propagating along a single score line, cracks tend to bifurcate multiple times. Consequently, the glass usually breaks into multiple pieces of random shape.

A method of controllably separating a strengthened glass sheet into multiple pieces or parts is provided. The method is controllable in the sense that the glass sheet is separated along a predetermined line or plane in a controlled or guided fashion. At least one of the pieces formed by separating the strengthened glass sheet has at least one of a predetermined shape and predetermined dimension. The method comprises first providing a strengthened glass sheet having first and second surfaces, strengthened surface layers under compressive stress and extending from each of the first and second surfaces to a depth of layer, and a central region under a tensile stress. At least one damage line is then formed in the central region and outside the strengthened surface layers. A crack is then initiated and propagated along the at least one damage line to separate the strengthened glass sheet into multiple pieces, one of which has at least one of a predetermined shape and predetermined dimension.

A strengthened glass sheet is first provided. The strengthened glass sheet has a first surface and a second surface that are substantially parallel to—or conform to the shape of (i.e., conformal to)—each other. The strengthened glass sheet may be planar or, alternatively, may be a three dimensional sheet having, for example, at least one curved surface, or the like.

Turning to FIG. 1, a cross-sectional view of a strengthened glass sheet is schematically shown. Strengthened glass sheet 100 has a thickness t and length l, a first surface 110 and second surface 120 that are substantially parallel to each other, central portion 115, and edges 130 joining first surface 110 to second surface 120. Strengthened glass sheet 100 is either thermally or chemically strengthened, and has strengthened surface layers 112, 122 extending from first surface 110 and second surface 120, respectively, to depths $d_1$, $d_2$, below each surface. Strengthened surface layers 112, 122 are under a compressive stress, while central portion 115 is under a tensile stress, or in tension. The tensile stress in central portion 115 balances the compressive stresses in strengthened surface layers 112, 122, thus maintaining equilibrium within strengthened glass sheet 100. The depths $d_1$, $d_2$ to which the strengthened surface layers 112, 122 extend are generally referred to individually as the "depth of layer." A portion 132 of edge 130 may also be strengthened as a result of the strengthening process. Thickness t of strengthened glass sheet 100 is generally in a range from about 0.3 mm up to about 2 mm. In one embodiment, thickness t is in a range from about 0.5 mm up to about 1.3 mm.

The methods described herein are used to separate any glass that is either thermally or chemically strengthened by those means known in the art. In one embodiment, the strengthened glass sheet 100 is, for example, a soda lime glass. In another embodiment, strengthened glass sheet 100 is an alkali aluminosilicate glass. In a particular embodiment, the glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol %≦$Li_2O$+$Na_2O$+$K_2O$≦20 mol % and 0 mol %≦MgO+CaO≦10 mol %. In another embodiment, the glass comprises 64 mol %≦$SiO_2$≦68 mol %; 12 mol %≦$Na_2O$≦16 mol %; 8 mol %≦$Al_2O_3$≦12 mol %; 0 mol %≦$B_2O_3$≦3 mol %; 2 mol %≦$K_2O$≦5 mol %; 4 mol %≦MgO≦6 mol %; and 0 mol %≦CaO≦5 mol %, wherein: 66 mol %≦$SiO_2$+$B_2O_3$+CaO≦69 mol %; $Na_2O$+$K_2O$+$B_2O_3$+MgO+CaO+SrO>10 mol %; 5 mol %≦MgO+CaO+SrO≦8 mol %; ($Na_2O$+$B_2O_3$)—$Al_2O_3$≦2 mol %; 2 mol %≦$Na_2O$—$Al_2O_3$≦6 mol %; and 4 mol %≦($Na_2O$+$K_2O$)—$Al_2O_3$≦10 mol %. In one particular embodiment, the glass has the composition: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$. In another embodiment, the glass has the composition: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$. The glass may, in some embodiments, be substantially free of lithium, whereas in other embodiments, the glass may be substantially free of at least one of arsenic, antimony, and barium. The glass may also be down drawable; i.e., formable by methods such as slot draw or fusion draw processes. In these instances, the glass has a liquidus viscosity of at least 130 kpoise. Non-limiting examples of such alkali aluminosilicate glasses are described in U.S. patent application Ser. No. 11/888,213, by Adam J. Ellison et al., entitled "Down-Drawable, Chemically Strengthened Glass for Cover Plate," filed on Jul. 31, 2007, which claims priority from U.S. Provisional Patent Application 60/930,808, filed on May 22, 2007, and having the same title; U.S. patent application Ser. No. 12/277,573, by Matthew J. Dejneka et al., entitled "Glasses Having Improved Toughness and Scratch Resistance," filed on Nov. 25, 2008, which claims priority from U.S. Provisional Patent Application 61/004,677, filed on Nov. 29, 2007; U.S. Provisional Patent Application No. 61/067,130, by Matthew J. Dejneka et al., entitled "Fining Agents for Silicate Glasses," filed Feb. 26, 2008; U.S. Provisional Patent Application No. 61/067,732, by Matthew J. Dejneka et al., entitled "Ion-Exchanged, Fast Cooled Glasses," filed Feb. 29, 2008; and U.S. Provisional Patent Application No. 61/087,324, by Kristen L. Barefoot et al., entitled "Chemically Tempered Cover Glass," filed Aug. 8, 2008, the contents of which are incorporated herein by reference in their entirety.

As previously described herein, the glass, in one embodiment, is chemically strengthened by an ion exchange process in which ions in the surface layer of the glass are replaced by larger ions having the same valence, or oxidation state. In one particular embodiment, the ions in the surface layer and the larger ions are monovalent alkali metal cations, such as $Li^+$ (when present in the glass), $Na^+$, $K^+$, $Rb^+$, and $Cs^+$. Alternatively, monovalent cations in the surface layer may be replaced with monovalent cations, such as $Ag^+$ or the like, other than alkali metal cations.

Ion exchange processes are typically carried out by immersing glass in a molten salt bath containing the larger ions. It will be appreciated by those skilled in the art that parameters for the ion exchange process, including, but not limited to, bath composition and temperature, immersion time, the number of immersions of the glass in a salt bath (or baths), use of multiple salt baths, additional steps such as annealing, washing, and the like, are generally determined by the composition of the glass and the desired depth of layer and compressive stress of the strengthened glass that is to be achieved as a result of the strengthening operation. By way of example, ion exchange of alkali metal-containing glasses may be achieved by immersion in at least one molten bath containing a salt such as, but not limited to, nitrates, sulfates, and chlorides of the larger alkali metal ion. The temperature of the molten salt bath typically is in a range from about 380° C. up to about 450° C., while immersion items range from about 15 minutes up to about 16 hours.

Non-limiting examples of ion exchange processes are provided in the U.S. patent applications and provisional patent applications that have been previously referenced hereinabove. In addition, non-limiting examples of ion exchange processes in which glass is immersed in multiple ion exchange baths, with washing and/or annealing steps between immersions are described in U.S. Provisional Patent Application No. 61/079,995, by Douglas C. Allan et al., entitled "Glass with Compressive Surface for Consumer Applications," filed Jul. 11, 2008, in which glass is strengthened by immersion in multiple, successive, ion exchange treatments in salt baths of different concentrations; and U.S. Provisional Patent Application No. 61/084,398, by Christopher M. Lee et al., entitled "Dual Stage Ion Exchange for Chemical Strengthening of Glass," filed Jul. 29, 2008, in which glass is strengthened by ion exchange in a first bath is diluted with an effluent ion, followed by immersion in a second bath having a smaller concentration of the effluent ion than the first bath. The contents of U.S. Provisional Patent Application Nos. 61/079,995 and No. 61/084,398 are incorporated herein by reference in their entirety.

In another embodiment, strengthened glass sheet 100 may be strengthened by thermal tempering. In this technique, strengthened glass sheet 100 is heated up to a temperature that is greater than the strain point of the glass and rapidly cooled to a temperature below the strain point to create strengthened surface layers 112, 122.

In the next step, at least one damage line is formed within strengthened glass sheet 100 in the central region 115, which is under tensile stress, of strengthened glass sheet 100. In the embodiment schematically shown in FIG. 2, first and second damage lines 140, 150 are formed in central region 115. The at least one damage line is formed along a predetermined axis, line, or direction within strengthened glass sheet 100 and is located outside of strengthened surface layers 112, 122. The at least one damage line is formed in a plane that is perpendicular to first surface 110 and second surface 120.

In one embodiment, the damage lines are formed by irradiating strengthened glass sheet 100 with a laser that operates in the window of transparency of the glass transmission spectrum. Damage within the bulk of strengthened glass sheet 100 is generated by nonlinear absorption when the intensity or fluence of the laser beam exceeds a threshold value. Rather than creating damage lines by heating the glass, nonlinear absorption creates damage lines by breaking molecular bonds; the bulk of strengthened glass sheet 100 experiences no excessive heating. In one embodiment, the laser is a nanosecond pulsed Nd laser operating at the fundamental wavelength of 1064 nm, or harmonics thereof (e.g., 532 nm, 355 nm), with a repetition rate of 100-150 kHz. The power of the nanosecond-pulsed Nd laser is in a range from about 1 W up to about 3 W.

Figure 2:
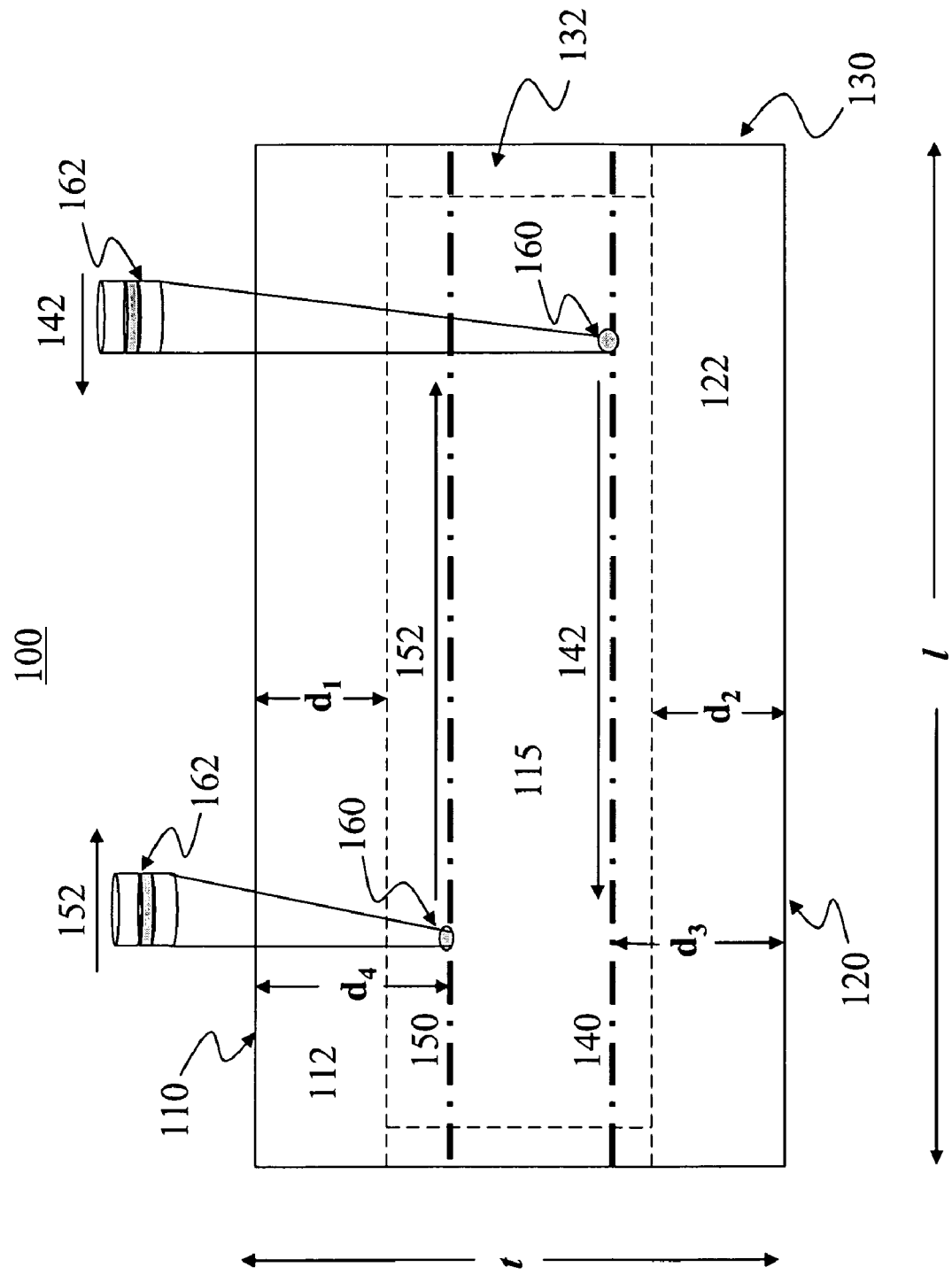
FIG. 2 is a schematic cross-sectional view of a strengthened glass sheet having laser-formed damage lines.

The formation of damage lines in strengthened glass sheet 100 by laser irradiation is schematically shown in FIG. 2. A first laser-formed damage line 140 is formed by irradiating strengthened glass sheet 100 with laser beam 160, which is generated by laser 162 and laser optics (not shown) that are needed to focus laser beam 160. Laser beam 160 is focused above second surface 120 and second strengthened surface layer 122 to form first damage line 140. First damage line 140 is formed at a depth $d_3$ from second surface 120, which is greater than depth $d_2$ of second strengthened surface layer 122. Thus, first damage line 140 is located within central region 115, which is under tensile stress, and outside the surface region—i.e., second strengthened surface layer 122—that is under compressive stress. At least one of strengthened glass sheet 100 and laser beam 160 is translated in direction 142 along line l of strengthened glass sheet 100 to form first damage line 140. In one embodiment, strengthened glass sheet 100 is translated with respect to laser beam 160. In another embodiment, laser beam 160 is translated with respect to strengthened glass sheet 100. Such movement may be accomplished using translatable stages, tables, and the like that are known in the art.

After forming first damage line 140, laser bean 160 is refocused below first surface 110 and first strengthened surface layer 112 to form second damage line 150 in central region 115. Second damage line 150 is formed at a depth $d_4$, which is greater than depth $d_1$ of first strengthened surface layer 112, and between first damage line 140 and first strengthened layer 112. Thus, second damage line 150 is located outside the surface region—i.e., first strengthened surface layer 112—that is under compressive stress.

In one embodiment, laser beam 160 is translated in direction 152 along line l of strengthened glass sheet 100 to form second damage line 150 by moving at least one of strengthened glass sheet 100 and laser beam 160. In one embodiment, direction 152 of translation of laser beam 160 or strengthened glass sheet 100 that is used to form second damage line 150 is opposite direction 142 of translation that is used to form first damage line 140. In one embodiment, first damage line 140, which is furthest from laser 162 and the associated laser optics, is formed first, followed by formation of second damage line 150, which is closer to laser 162 and associated laser optics. In one embodiment, first and second damage lines 140, 150 are formed by laser beam at a rate ranging from about 30 cm/s up to about 50 cm/s. In another embodiment, first damage line 140 and second damage line 150 may be formed simultaneously by splitting laser beam 160.

In one embodiment, formation of first and second damage lines 140, 150 includes overwriting, or making at least two passes, with laser beam 160 along each damage line; i.e., laser beam 160 is translated along each damage line at least two times, preferably in succession (within 0.1 second) of each other. This may be accomplished by splitting laser beam 160 or by other means known in the art, so as to make multiple passes simultaneously with only a slight delay of about 0.1 second For a strengthened glass sheet 100 having a thickness t of about 1 mm, the depths $d_3$, $d_4$ of first and second damage lines 140, 150 below first and second surfaces 110, 120, respectively, are in a range form about 50 μm up to about 350 μm. In one embodiment, depths $d_3$, $d_4$ are in a range from about 100 μm up to about 150 μm. In another embodiment, depths $d_3$, $d_4$ are in a range from about 100 μm up to about 150 μm.

After forming the at least one damage line in strengthened glass sheet 100, a crack is initiated and propagated to separate strengthened glass sheet 100 into a plurality of smaller glass pieces, at least one of which is of the desired or predetermined dimensions and/or shape. Strengthened glass sheet 100 is separated along a plane defined by the damage lines formed within the strengthened glass sheet 100. Referring to FIG. 2, strengthened glass sheet 100 is separated along predetermined line l and a plane defined by first damage line 140 and second damage line 150.

Crack initiation, propagation, and separation may be accomplished by those means known in the art such, but not limited to, as manual or mechanical flexion of strengthened glass sheet 100 on opposite sides of the plane formed by the damage lines. In one embodiment, a scribe may be used to introduce a flaw on either first or second surface 110, 120 to initiate the crack, which then propagates along first and second damage lines 140, 150. In another embodiment, mechanical scribes of about 2-3 mm in length may be made on edge 130 of strengthened glass sheet 100 to facilitate crack initiation. In another embodiment, crack initiation, propagation, and separation are achieved by immersing strengthened glass sheet 100 in a liquid, such as water. In still another embodiment, crack initiation, propagation, and separation may be achieved by repeated overwriting of first and second damage lines 140,150 with laser beam 160. For example, strengthened glass sheets of some alkali aluminosilicate glasses may be separated by overwriting first and second damage lines 140, 150 at least twice with laser beam 160. Alternatively, the power of laser beam 162 may be increased to a level that is sufficient to affect separation. Strengthened alkali aluminosilicate glass sheets may, for example, be completely separated by using a 355 nm nanosecond pulsed Nd laser having a power of at least 1 W.

Figure 3:
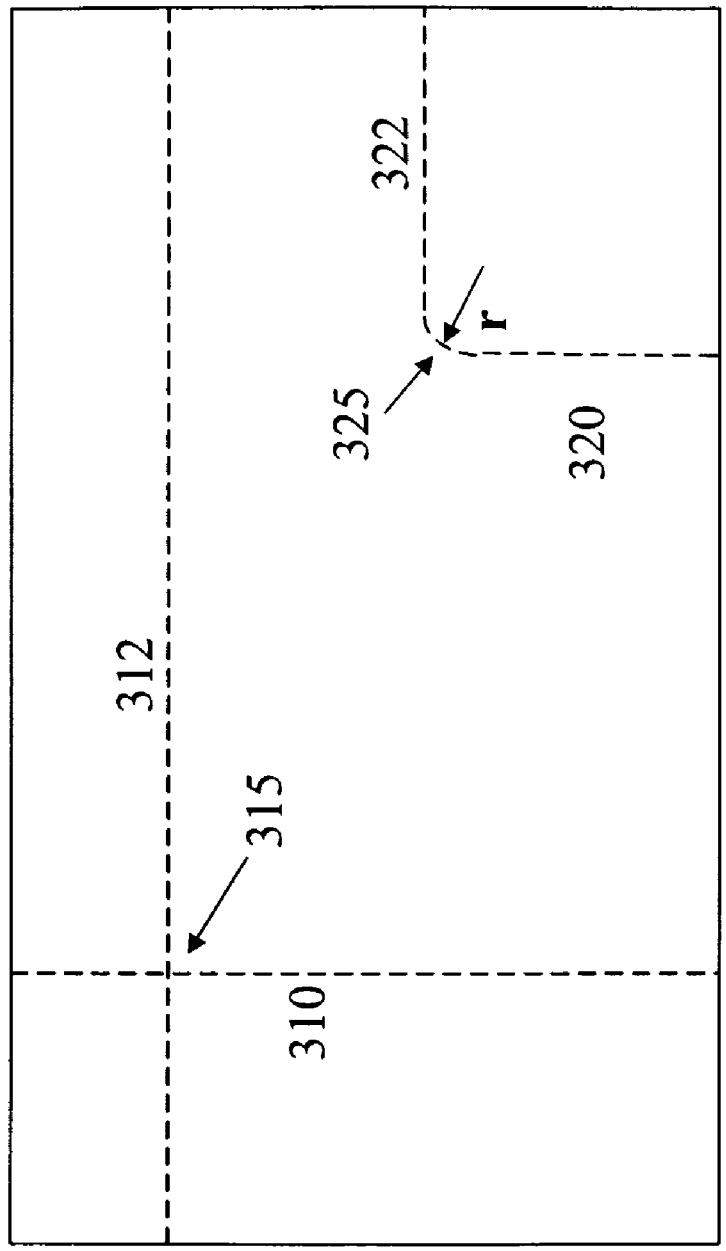
FIG. 3 is a schematic top view top view of a strengthened glass sheet having a plurality of cuts.

Using the methods described herein, strengthened glass sheet 100 may be separated or cut along a predetermined straight line (e.g., line l in FIGS. 1 and 2) to form a plurality of smaller glass sheets with little or no chipping along the edge created by separation of strengthened glass sheet 100. A top view of strengthened glass sheet 100 having a plurality of cuts is schematically shown in FIG. 3. Straight cuts 310, 312 may cross or intersect each other at right angles to yield cut glass sheets having square corners 315. Alternatively, the methods described herein may be used to make radius cuts 325 (i.e., a cut following an arc having radius r) in strengthened glass sheet 100, thus providing cut glass sheets cut along lines 320, 322 having rounded corners 325. Such radius cuts, in one embodiment, may have a radius r of greater than or equal to about 5 mm. Whereas it is problematic to cut a strengthened glass sheet into narrow strips by other means, the methods described herein may be used to cut a strengthened glass sheet into strips as narrow as 3 mm. the methods described herein also allow strengthened glass sheets to be cut with zero-width kerf (i.e., substantially no loss of material at the point of separation) and with little or no generation of debris.

A strengthened glass article is also provided. The strengthened glass article has a first surface and a second surface. Each of the first surface and the second surface has a strengthened surface layer under a compressive stress and extending from the surface to a depth of layer, and a central region under a tensile stress. The strengthened glass article also has at least one edge joining the first and second surface, wherein the at least one edge is substantially free of chipping.

The at least one edge is formed by separating strengthened glass sheet 100, using the methods described herein above. The at least one edge is formed along the plane at which strengthened glass sheet 100 is separated into at least two pieces.

The strengthened glass article may be any glass that is either chemically or thermally strengthened, as described hereinabove. In one embodiment, the glass is an alkali aluminosilicate glass, such as those previously described herein.

The strengthened glass article is resistant to both chipping and scratching, and is well suited for use in cover plates for mobile communication and entertainment devices such as telephones, music players, video players, or the like; as a screen for portable computers; or in other applications that require strong and tough glass with good scratch resistance.

The following example illustrates the features and advantages provided by the methods described herein and is in no way intended to limit the disclosure or appended claims thereto.

Example 1

A glass sample having the composition 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$ underwent ion-exchange by immersion in a molten $KNO_3$ bath for seven hours at 410° C. The resulting thickness of the ion-exchanged layer on the surface of the glass was about 50 μm.

The glass sample was mounted on a computer-controlled XYZ stage and was translated at speeds ranging from 30 mm/s to 300 mm/s. The output from a 355-nm nanosecond Nd-YAG laser was first focused 50-100 μm above the rear surface (i.e., the surface of the glass farthest from the laser; e.g., second surface 120 in FIGS. 1 and 2) with a 0.27-NA lens into a spot 1-3 μm in diameter. The mean power of the laser beam was 1 W, and the repetition rate was 150 kHz. After the first damage line was written near the rear surface, the beam was refocused about the same distance below the front surface (i.e., the surface of the glass nearest to the laser; e.g., first surface 110 in FIGS. 1 and 2) of the glass and the sample was traversed again to write the second damage line near the front surface. The two damage lines formed in the glass allowed the strengthened glass sheet to be divided by manual snapping or flexion.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure.

The invention claimed is:

1. A method of separating a strengthened glass sheet, the method comprising:
   a. providing the strengthened glass sheet, the strengthened glass sheet having a first surface and a second surface, wherein each of the first surface and the second surface has a strengthened surface layer under a compressive stress and extending from the surface to a depth of layer, and a central region under a tensile stress;
   b. forming at least one laser induced damage line in the central region at a predetermined depth below the first surface by irradiating the glass sheet with a nanosecond pulsed laser, the nanosecond pulsed laser having a power in a range from about 1 W to 3 W; and
   c. initiating and propagating a crack to separate the glass sheet along the at least one damage line into at least two pieces, wherein at least one of the pieces has at least one of a predetermined shape and a predetermined dimension.

2. The method of claim 1, wherein the step of forming at least one damage line in the central region comprises forming a first damage line and a second damage line in the central region, the second damage line being located between the strengthened surface layer of the first surface and the first damage line, the first damage line and the second damage line defining a plane perpendicular to the first surface and the second surface.

3. The method of claim 2, wherein the strengthened surface layers are chemically strengthened by ion exchange.

4. The method of claim 1, wherein the strengthened surface layers of the first surface and the second surfaces are thermally strengthened surfaces.

5. The method of claim 1, wherein the strengthened surface layers of the first surface and the second surfaces are chemically strengthened surfaces.

6. The method of claim 1, wherein the strengthened glass sheet comprises an alkali aluminosilicate glass.

7. The method of claim 6, where in the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % ≦ $Li_2O$+$Na_2O$+$K_2O$ ≦ 20 mol % and 0 mol % ≦ MgO+CaO ≦ 10 mol %.

8. The method of claim 7, wherein the alkali aluminosilicate glass comprises: 66.7 mol % $SiO_2$; 10.5 mol % $Al_2O_3$; 0.64 mol % $B_2O_3$; 13.8 mol % $Na_2O$; 2.06 mol % $K_2O$; 5.50 mol % MgO; 0.46 mol % CaO; 0.01 mol % $ZrO_2$; 0.34 mol % $As_2O_3$; and 0.007 mol % $Fe_2O_3$.

9. The method of claim 7, wherein the alkali aluminosilicate glass comprises: 66.4 mol % $SiO_2$; 10.3 mol % $Al_2O_3$; 0.60 mol % $B_2O_3$; 4.0 mol % $Na_2O$; 2.10 mol % $K_2O$; 5.76 mol % MgO; 0.58 mol % CaO; 0.01 mol % $ZrO_2$; 0.21 mol % $SnO_2$; and 0.007 mol % $Fe_2O_3$.

10. The method of claim 1, wherein the step of initiation and propagating a crack to separate the strengthened glass sheet along the at least one damage line into at least two pieces comprises at least one of flexing and scribing the strengthened glass sheet along a plane to separate the strengthened glass sheet into the plurality of pieces, wherein the plane is defined by the at least one damage line and intersects the first surface and the second surface.

11. The method of claim 1, wherein the first surface and the second surface are substantially parallel to each other.

12. The method of claim 1, wherein the strengthened glass sheet is planar.

13. The method of claim 1, wherein the first surface and the second surface are non-planar and conformal to each other.

14. The method of claim 1, wherein the predetermined depth is in a range from about 50 µm up to about 350 µm.

15. A method of separating a strengthened glass sheet, the method comprising:
  a. providing the strengthened glass sheet, the strengthened glass sheet having a first surface and a second surface, wherein each of the first surface and the second surface have a strengthened surface layer under a compressive stress and extending from the surface to a depth of layer, and a central region under a tensile stress;
  b. forming a first laser-induced damage line in the central region at a predetermined depth below the first surface by irradiating the glass sheet with a laser having a power in a range from about 1 W to 3 W;
  c. forming a second laser-induced damage line, the second laser-induced damage line being located between the strengthened surface layer of the first surface and the first laser-induced damage line, the second laser-induced damage line being parallel to the first laser-induced damage line, the first laser-induced damage line and the second laser-induced damage line defining a plane being perpendicular to the first surface and the second surface; and
  d. initiating and propagating a crack to separate the strengthened glass sheet into at least two pieces, wherein at least one of the pieces has at least one of a predetermined shape and a predetermined dimension.

16. The method of claim 15, further including overwriting each of the first laser-induced damage line and the second laser-induced damage line at least once with a laser beam.

17. The method of claim 15, wherein the predetermined depth of the first laser-induced damage line is in a range from about 50 µm up to about 350 µm.

18. The method of claim 15, wherein the step of initiating and propagating a crack to separate the strengthened glass sheet into the plurality of glass sheets along the plane comprises at least one of flexing and scribing the strengthened glass sheet along the plane to separate the strengthened glass sheet into the plurality of pieces.

19. The method of claim 15, wherein the step of providing the strengthened glass sheet comprises ion exchanging a layer of each of the first surface and second surface to chemically strengthen the glass.

20. The method of claim 15, wherein the strengthened glass sheet comprises an alkali aluminosilicate glass.

21. The method of claim 20, where in the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; wherein 12 mol % $\leq Li_2O+Na_2O+K_2O \leq 20$ mol % and 0 mol % $\leq$ MgO+CaO $\leq 10$ mol %.

22. The method of claim 15, wherein the first surface and the second surface are substantially parallel to each other.

23. The method of claim 15, wherein the strengthened glass sheet is planar.

* * * * *